(12) United States Patent
Thoen

(10) Patent No.: US 9,742,471 B1
(45) Date of Patent: Aug. 22, 2017

(54) NFMI BASED SYNCHRONIZATION

(71) Applicant: NXP B.V., Eindhoven (NL)

(72) Inventor: Steven Mark Thoen, Leuven (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/185,970

(22) Filed: Jun. 17, 2016

(51) Int. Cl.
*H04R 1/10* (2006.01)
*H04R 3/12* (2006.01)
*H04B 5/00* (2006.01)
*H04W 4/00* (2009.01)
*H04W 56/00* (2009.01)
*H04L 29/08* (2006.01)

(52) U.S. Cl.
CPC ....... *H04B 5/0031* (2013.01); *H04L 67/1095* (2013.01); *H04L 67/303* (2013.01); *H04W 4/008* (2013.01); *H04W 56/001* (2013.01)

(58) Field of Classification Search
CPC ... H04R 3/00; H04R 3/12; H04R 1/10; H04R 5/033; H04R 29/00
See application file for complete search history.

(56) References Cited

U.S. PATENT DOCUMENTS

| 8,699,732 | B2 | 4/2014 | Zellner | |
|---|---|---|---|---|
| 9,088,406 | B2 * | 7/2015 | Newham | H04L 7/041 |
| 9,167,348 | B1 * | 10/2015 | Vartanian | H04R 1/1041 |
| 9,210,493 | B2 * | 12/2015 | Swanson | H04R 1/1016 |
| 2008/0076489 | A1 | 3/2008 | Rosener et al. | |
| 2008/0298606 | A1 * | 12/2008 | Johnson | H04R 1/1091 |
| | | | | 381/74 |
| 2014/0219467 | A1 * | 8/2014 | Kurtz | H04R 3/12 |
| | | | | 381/74 |
| 2014/0376735 | A1 | 12/2014 | Asrani et al. | |
| 2017/0109131 | A1 * | 4/2017 | Boesen | G06F 3/012 |

FOREIGN PATENT DOCUMENTS

WO    WO-2014/124100 A1    8/2014

OTHER PUBLICATIONS

Bragi; "Wireless Smart Earphones"; retrieved from the Internet http://www.bragi.com/; 16 pages (Jun. 17, 2016).
Hunn, Nick; "The Market for Smart Wearable Technology—A Consumer Centric Approach"; retrieved from the Internet http://www.nickhunn.com/wp-content/uploads/downloads/2014/08/The-Market-for-Smart-Wearables.pdf on Jun. 13, 2016; 63 pages; (Feb. 2015).
NXP; "NXH2280UK: NFMI Radio for Wireless Audio and Data Streaming"; retrieved from the internet http://www.nxp.com/products/interface-and-connectivity/wireless-connectivity/nfmi-radio-solutions/nfmi-radio-for-wireless-audio-and-data-streaming:NXH2280UK; 2 pages (Jun. 17, 2016).

(Continued)

*Primary Examiner* — Blane Jackson

(57) ABSTRACT

One example discloses an apparatus for synchronization, including: a first wireless device, having a first device profile, a near-field magnetic induction (NFMI) signal input and a wireless signal input; wherein the first wireless device is configured to, receive, through the wireless signal input, a first set of data; optimize the first set of data based on the first device profile; receive, through the NFMI signal input, a second set of data optimized for a second device profile of a second wireless device; and synchronize the first and second sets of optimized data based on a set of common data attributes.

17 Claims, 6 Drawing Sheets

(56) References Cited

OTHER PUBLICATIONS

U.S. Appl. No. 15/185,970, not yet published; 29 pages; (Jun. 17, 2016).
Bragi; "Wireless Smart Earphones"; retrieved from the Internet http://www.bragi.com/; 16 pages (Jun. 17, 2016).
Hunn, Nick, WiFore Consulting; "The Market for Smart Wearable Technology—A Consumer Centric Approach"; retrieved from the Internet http://www.nickhunn.com/wp-content/uploads/downloads/2014/08/The-Market-for-Smart-Wearables.pdf ; 63 pages (Feb. 2015).
U.S. Appl. No. 15/185,929 not yet published, 42 pages Jun. 17, 2016.

* cited by examiner

NFMI BASED SYNCHRONIZATION

The present specification relates to systems, methods, apparatuses, devices, articles of manufacture and instructions for NFMI based synchronization.

SUMMARY

According to an example embodiment, an apparatus for synchronization, comprising: a first wireless device, having a first device profile, a near-field magnetic induction (NFMI) signal input and a wireless signal input; wherein the first wireless device is configured to, receive, through the wireless signal input, a first set of data; optimize the first set of data based on the first device profile; receive, through the NFMI signal input, a second set of data optimized for a second device profile of a second wireless device; and synchronize the first and second sets of optimized data based on a set of common data attributes.

In another example embodiment, the common data attributes include at least one of: time, embedded code, signal feature, signal characteristic, or trigger condition.

In another example embodiment, the synchronization of the data sets includes at least one of: signal amplitude adjustment, signal power adjustment, equalization, signal balancing, signal compression, Dynamic Range Compression (DRC), or Ambient Volume Control (AVC).

In another example embodiment, the sets of data include at least one of: audio data, sensor data, transducer data, configuration data, health data, device status, battery charge level, or communications link quality.

In another example embodiment, the first and second device profiles include at least one of: an acoustic profile, sensor profile, transducer profile, or a battery profile.

In another example embodiment, the wireless devices include at least one of: a microphone, an earbud, a hearable, a smartphone, a smartwatch, a wearable device, a tablet or a computer.

In another example embodiment, the first and second sets of data are received from at least one of: a server, a network, a computer, a connected device, or a smartphone.

In another example embodiment, the first wireless device is further configured to: request transfer of the second set of data optimized for the second device profile of a second wireless device.

In another example embodiment, further comprising the second wireless device, having an NFMI signal output; the NFMI signal input is configured to receive the NFMI signal output over an NFMI channel; and the second wireless device is further configured to not transfer the second set of data over the NFMI channel until the first wireless device requests transfer.

In another example embodiment, further comprising the second wireless device; the first and second wireless devices independently receive an audio data stream; the first wireless device is configured to optimize the audio data stream based on the first device profile; the second wireless device is configured to optimize the audio data stream based on the second device profile; and the first wireless device is configured to align in time both optimized audio data streams.

According to an example embodiment, an article of manufacture including at least one non-transitory, tangible machine readable storage medium containing executable machine instructions for synchronization: wherein the article includes, a first wireless device, having a first device profile, a near-field magnetic induction (NFMI) signal input and a wireless signal input; wherein the instructions include, receiving, through the wireless signal input, a first set of data; optimizing the first set of data based on the first device profile; receiving, through the NFMI signal input, a second set of data optimized for a second device profile of a second wireless device; and synchronizing the first and second sets of optimized data based on a set of common data attributes.

In another example embodiment, the common data attributes include at least one of: time, embedded code, signal feature, signal characteristic, or trigger condition.

In another example embodiment, synchronizing includes at least one of: signal amplitude adjustment, signal power adjustment, equalization, signal balancing, signal compression, Dynamic Range Compression (DRC), or Ambient Volume Control (AVC).

In another example embodiment, the sets of data include at least one of: audio data, sensor data, transducer data, configuration data, or health data.

In another example embodiment, the wireless devices include at least one of: a microphone, an earbud, a hearable, a smartphone, a smartwatch, a wearable device, a tablet or a computer.

In another example embodiment, the first and second device profiles include at least one of: an acoustic profile, sensor profile, or a transducer profile.

According to an example embodiment, an method for synchronization, comprising: receiving a first set of data over a wireless channel; optimizing the first set of data based on a first device profile of a first wireless device; receiving a second set of data optimized for a second device profile of a second wireless device over a near-field magnetic induction (NFMI) channel; and synchronizing the first and second sets of optimized data based on a set of common data attributes.

In another example embodiment, the first wireless device is additionally configured to: internally generate a third set of data; and synchronize the third and second sets of data based on the set of common data attributes.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

Figure 1:
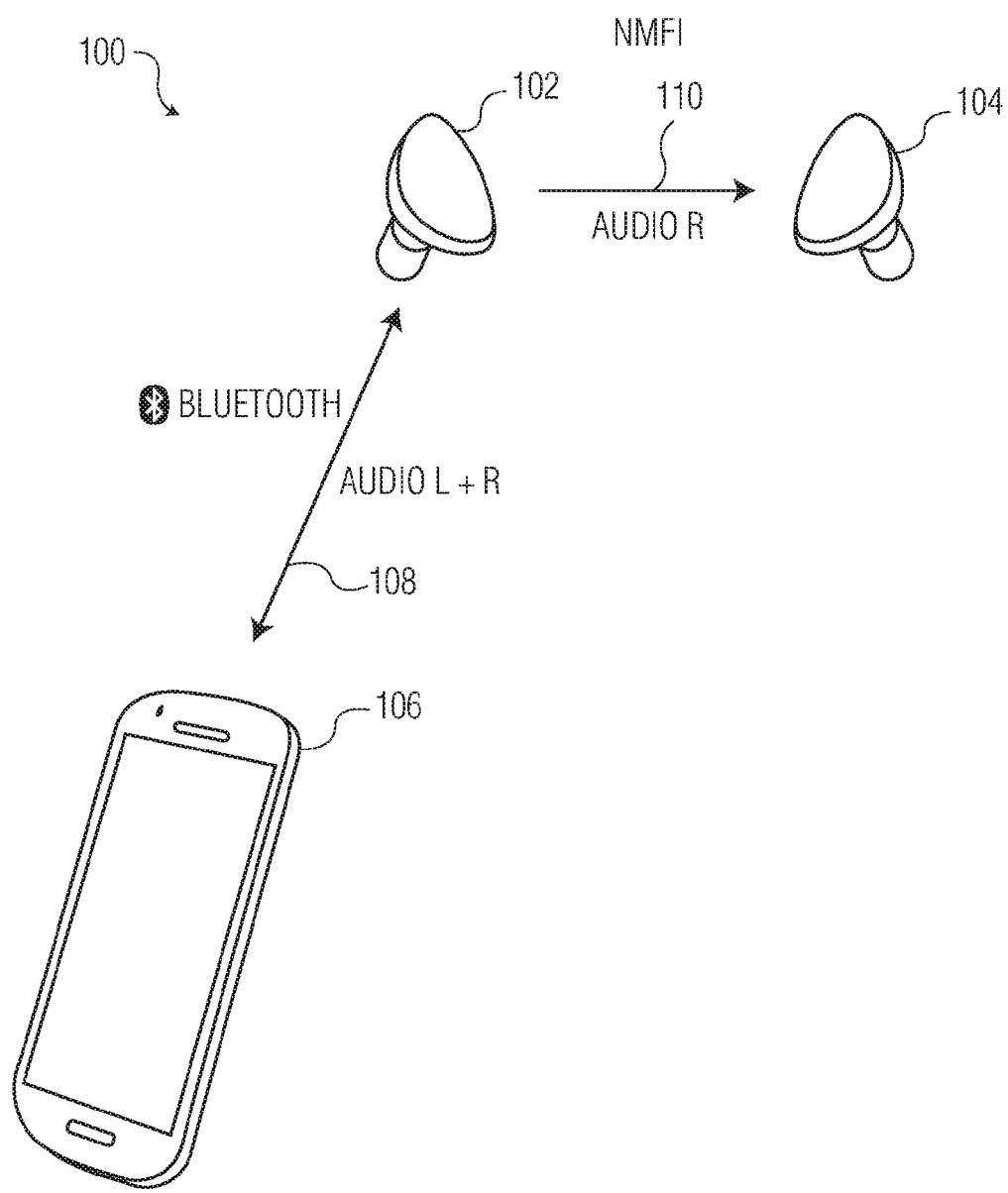
FIG. 1 is a first example apparatus for communication.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Wireless devices, such as wireless earbuds (also known as Hearables), in various embodiments include embedded voice, sound and sensor capabilities. Such wireless devices can be designed to support playback of stereo sound from an external device such as a cellphone, making phone calls, responding to voice commands, detecting sound events, and so on.

Some example embodiments communicate with a smartphone or other devices, such as tablet, computers, etc., through Bluetooth Classic or through Bluetooth Low Energy (BLE), and communicate with each other using Near-Field Magnetic Induction (NFMI) signals that can pass through various structures, including the human body, and in the case of hearables, through the human head.

FIG. 1 is a first example 100 apparatus for communication. Shown in the first example 100 is a first wireless device 102 (e.g. left earbud), a second wireless device 104 (e.g. right earbud), a third wireless device 106 (e.g. smartphone), a received signal 108 (e.g. left and right audio signal), and a forwarded signal 110 (e.g. right only audio signal).

This first apparatus 100 shows a single-sided NFMI apparatus, which in this example exchanges left (L) and right (R) audio channels for media playback, phone calls, or voice recognition.

In this single-sided NFMI apparatus, the first wireless device 102 (e.g. left or perhaps called the master earbud) includes a data connection either through: a cloud network, a smartphone, or another device. The first wireless device 102 effects audio playback and communication using one or more input transducers (e.g. local microphones) and one or more output transducers (e.g. speakers).

In this first example 100, data (e.g. audio) is streamed to the wireless devices 102, 104 (e.g. earbuds). The data includes a complete (e.g. L and R stereo audio) signal which is sent to just one of the wireless devices 102 (i.e. the L earbud). Thus there is a single audio source and a single audio sink.

In this example, Near-Field Magnetic Induction (NFMI) is used to transfer the forwarded signal 110 containing a relevant portion of the data (e.g. just the R audio track) to the other wireless device 104 (e.g. R earbud). If a user is wearing the earbuds 102, 104, then the NFMI signal travels through the user's body thereby creating a full stereo audio experience at the earbuds 102, 104.

Figure 2:
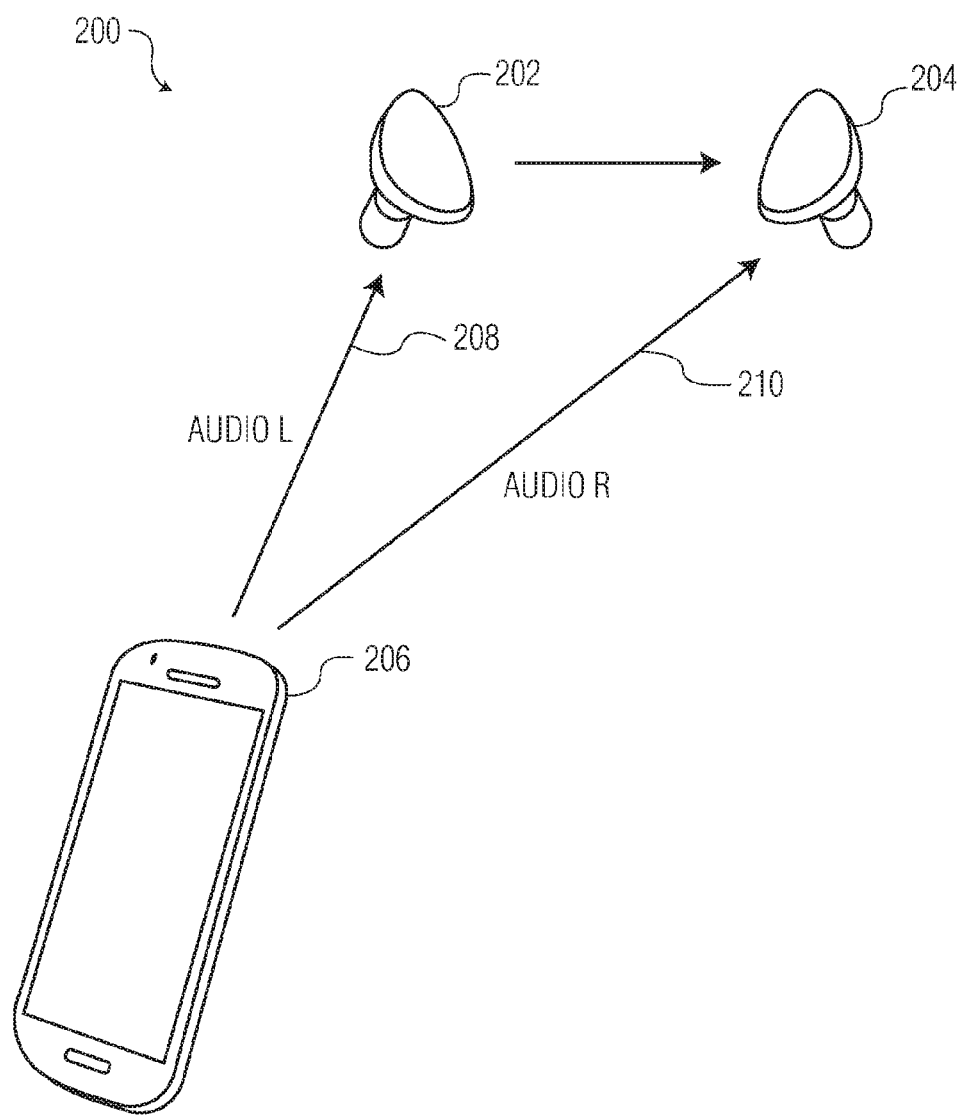
FIG. 2 is a second example apparatus for communication.

FIG. 2 is a second example 200 apparatus for communication. Shown in the second example 200 is a first wireless device 202 (e.g. left earbud), a second wireless device 204 (e.g. right earbud), a third wireless device 206 (e.g. smartphone), a first received signal 208 (e.g. left only audio signal), and a second received signal 210 (e.g. right only audio signal).

In the second example 200 double-sided apparatus, either a complete signal (e.g. stereo audio signal) or just relevant portions of the data (e.g. left and right audio tracks) can stream to multiple wireless devices 202, 204 (e.g. audio sinks). The third wireless device 206 (e.g. a smartphone) sets up separate L and R audio communications links with the earbuds 202, 204. In this example, NFMI is not used for earbud-to-earbud audio forwarding.

Figure 3:
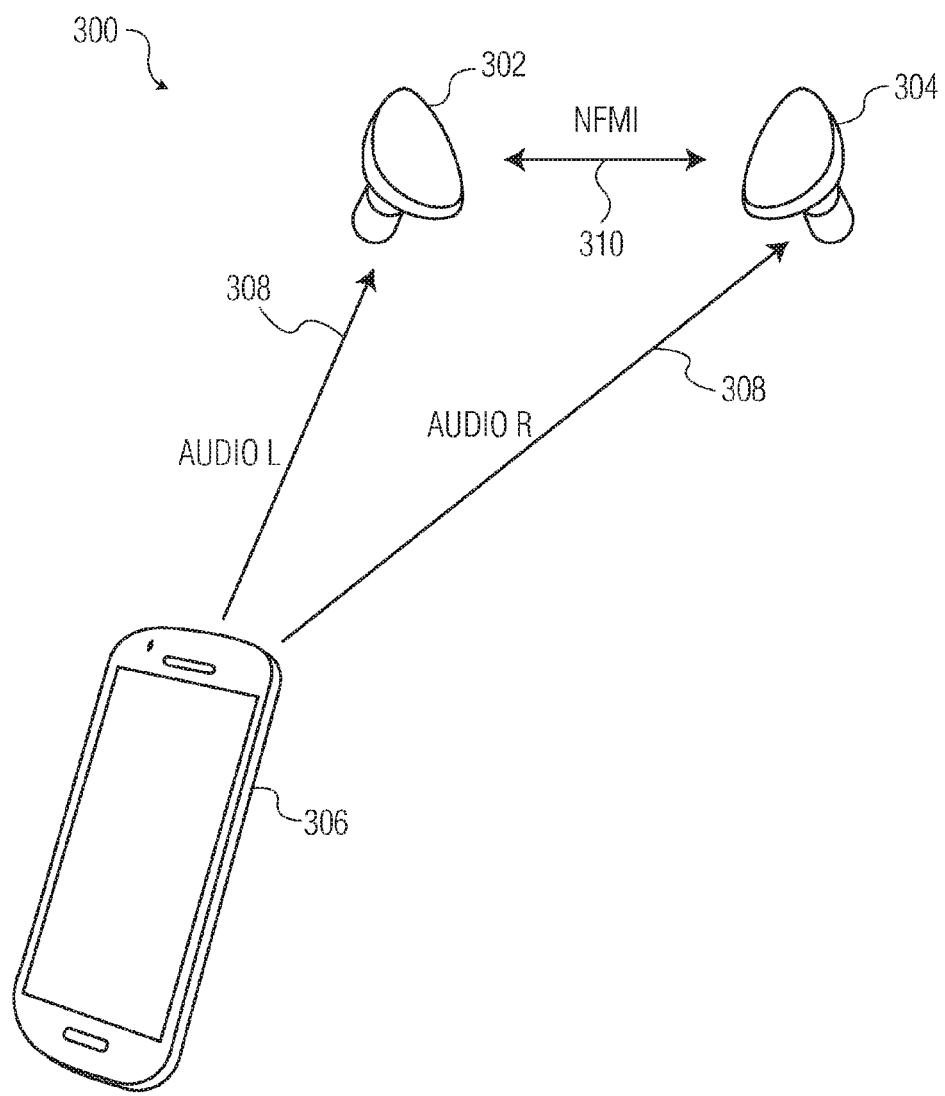
FIG. 3 is a third example apparatus which uses NFMI based synchronization.

FIG. 3 is a third example 300 apparatus which uses NFMI based synchronization. The third example 300 apparatus includes a first wireless device 302 (e.g. left earbud), a second wireless device 304 (e.g. right earbud), a third wireless device 306 (e.g. smartphone), a wireless channel 308, and an NFMI channel 310.

The wireless devices 302, 304 need not be the same in all example embodiments. In one example embodiment, the wireless devices 302, 304 could be two earbuds configured to be worn by a person. In another example embodiment, the wireless devices 302, 304 could be a smartwatch and a smartphone configured to be carried or worn by a person. In yet another example embodiment, the wireless devices could be two or more devices positioned at various locations in a conference room. The wireless devices 302, 304 thus could be: an earbud, a hearable, a smartphone, a smartwatch, a wearable device, a tablet, a computer, a wireless microphone, etc.

In third example 300, the NFMI channel 310 is used to synchronize audio data streams sent over the wireless channel 308 to the left and right earbuds 302, 304 with a very low latency. For example, with NFMI synchronization, the audio playback instance between L and R earbuds 302, 304 can be very accurately aligned in time. This preserves the audio stereo image.

The audio data stream (or as will be discussed below the techniques discussed herein can be applied to other data streams as well) can be processed and enhanced by each earbud individually through various algorithms such as equalization, level balancing, compression, etc. before being played back. Dynamic Range Compression (DRC) and Ambient Volume Control (AVC) are two such example audio processing algorithms.

However, without the NFMI channel 310, both earbuds would run their audio stream processing and enhancement algorithms independently on only their own local L or R audio track. Such independent processing and enhancement can lead to very different compression and volume levels between both earbuds 302, 304 which distorts the stereo image and lowers the overall perceived audio quality.

Using the NFMI channel 310, however, processing and enhancement algorithms can be improved. For example, in one example set of stereo earbuds, the power in the total stereo audio track is used as input for the compressor ($P_{tot}=avg(L^2+R^2)$) to adjusts the gain for both L and R channel jointly and identically. Using the NFMI channel 310 for synchronization, however, the gain for both channels can be set almost identically which preserves the stereo image.

In another example, when compression (e.g. Dynamic Range Compression (DRC)) is done by the wireless device 302, 304 (e.g. at the earbud side) and not in the third wireless device 306 (e.g. smartphone), algorithm settings need to be tweaked to the acoustic profile (e.g. characteristics) of the specific earbud (i.e. wireless device 302, 304). If each earbud only has access to either L or R channel, each earbud 302, 304 will set its gain based only on the power in its local channel (so either $P_L=avg(L^2)$ or $P_R=avg(R^2)$). This can lead to very different gain settings in both earbuds which destroys the stereo image.

However using synchronization, both earbuds 302, 304 can exchange $P_L$ and $P_R$ on a regular basis so they can both reconstruct $P_{tot}$ and keep their gains identical. This leads to a better preserved stereo image and better user experience.

Using DRC, the latency of the overall algorithm and gain setting is key to get good performance and should typically be below 2 ms. Thus while the $P_L$ and $P_R$ parameters could be exchanged between both earbuds by forwarding this data over the third wireless device 306 (e.g. smartphone), the induced latency could be too high for a DRC algorithm to work properly.

Since the NFMI channel 310 between the wireless devices 302, 404 is faster than the wireless channel 308 through the third wireless device 306 (e.g. smartphone), this allows for a very robust, low latency exchange of the required $P_L$ and $P_R$ parameters to keep the earbuds synchronized.

In another example configuration, an Ambient Volume Control (AVC) audio processing algorithm using the NFMI channel 310 for synchronization can also improve its accuracy.

For instance, in a wired stereo headphone, a volume can be automatically adapted to the ambient noise level to improve music quality. To this end, the gain of the left and right wired channel is adapted identically, dependent on the ambient noise energy picked up by an embedded microphone. However, in a wireless device (e.g. an earbud), each earbud will adapt its gain on a noise measured on each earbud's local microphone. Neither earbud has information on the noise level at the other earbud. This can lead to very different gain settings in both earbuds which reduces music quality (e.g. the stereo image).

Using the NFMI channel 310, however, enables both earbuds 302, 304 to synchronize their gain settings with low latency, resulting in a better preserved stereo image and higher music quality (e.g. better user experience).

NFMI based synchronization using the NFMI channel 310 thus improves the music quality of a wireless audio system, thereby enhancing an end user experience during listening. Using the NFMI channel 310, both earbuds can synchronize the playback instance of their respective audio channel, and/or synchronize their embedded audio enhancement algorithms, both with reduced latency.

Figure 4:
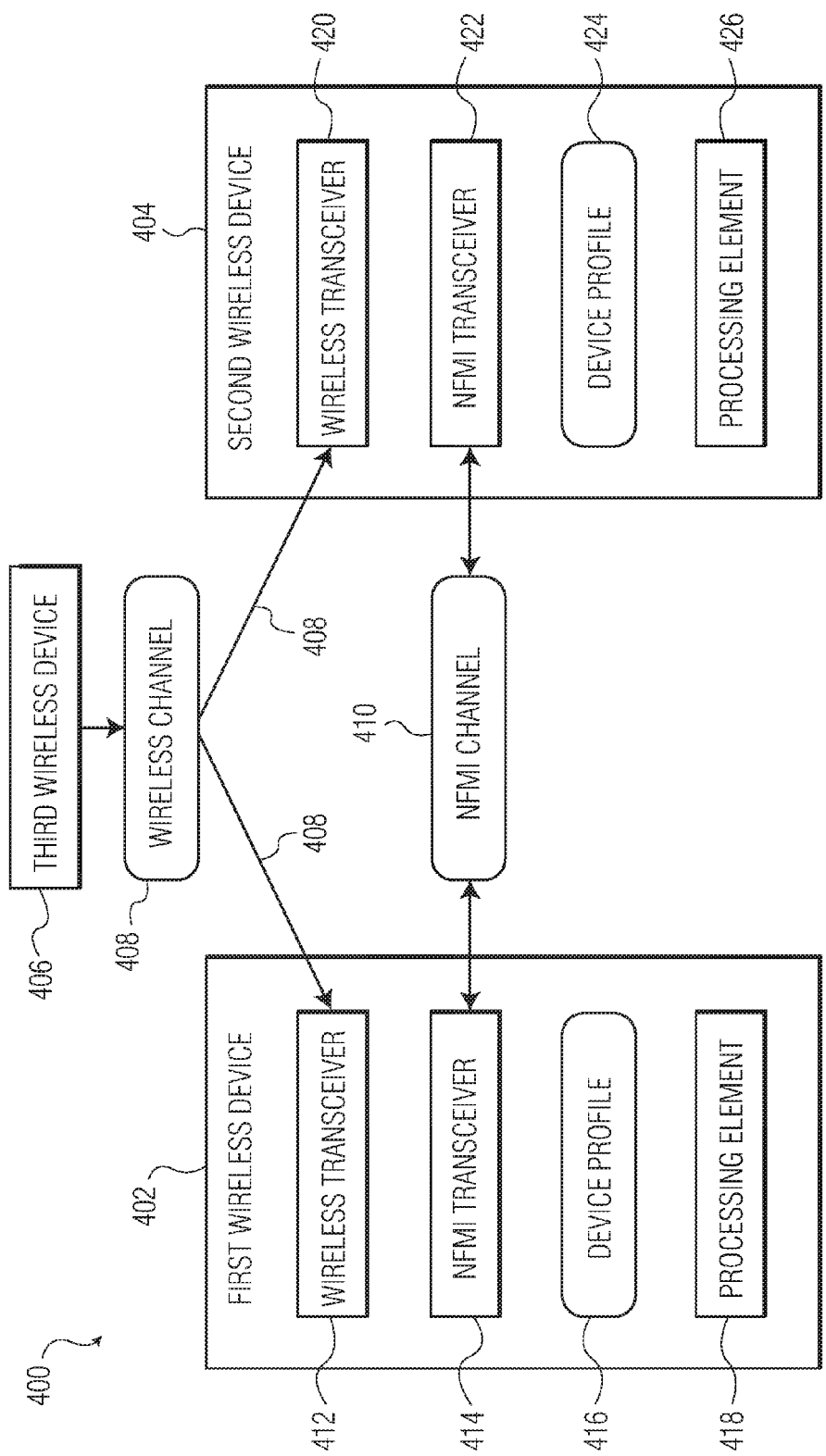
FIG. 4 is a fourth example apparatus which uses NFMI based synchronization.

FIG. 4 is a fourth example 400 apparatus which uses NFMI based synchronization. The fourth example 400 apparatus includes a first wireless device 402 (e.g. left earbud), a second wireless device 404 (e.g. right earbud), a third wireless device 406 (e.g. smartphone), a wireless channel 408, and an NFMI channel 410.

The first wireless device 402 (e.g. left earbud) includes a wireless transceiver 412, an NFMI transceiver 414, a device profile 416, and a processing element 418. The second wireless device 404 (e.g. right earbud) can also include a wireless transceiver 420, an NFMI transceiver 422, a device profile 424, and a processing element 426.

The wireless devices 402, 404 are characterized by their device profiles 416, 424 based on a type of data to be received or exchanged over the wireless channel 408 with the third wireless device 406 (e.g. smartphone). For example, the set of data could include: audio data, sensor data, transducer data, configuration data, health data, device status, battery charge level, or communications link quality. The wireless devices 402, 404 receive this data through their wireless transceivers 412, 420.

The wireless devices 402, 404 include NFMI transceivers 414, 422 for receiving and/or exchanging near-field magnetic induction (NFMI) synchronization signals. The wireless devices 402, 404 include processing elements 418, 426 configured to optimize the set of data received over the wireless channel 408 based on their device profiles 416, 424.

By receiving and/or exchanging these optimized sets of data over the NFMI channel 410, the wireless devices 402, 404 can use a set of common data attributes to synchronize the optimized data sets and thereby function in a coordinated way to present stereo audio, perhaps take health measurements, and the like.

The common data attributes used to synchronize the data sets could include: time stamps, embedded codes, signal features, signal characteristics, or trigger conditions.

In an example media or audio synchronization, the following data set characteristics could be adjusted: signal amplitude, signal power, equalization, signal balance, signal compression, Dynamic Range Compression (DRC), or Ambient Volume Control (AVC).

The device profile 416, 424, in one example embodiment, provides resonance and attenuation characteristics that are very specific to the wireless devices 402, 404, and in some examples may be specific to just a particular set of the wireless devices 402, 404. These acoustic profiles enable more accurate signal enhancements (e.g. beamforming) during later NFMI based synchronization and speech processing steps. In other example embodiments one or more of the wireless device's acoustic profiles could be generic. In other example embodiments, device profile 416, 424 include sensor profiles, transducer profiles, or battery profiles.

The wireless devices 402, 404 in various embodiments could be: a microphone, a earbud, a hearable, a smartphone, a smartwatch, a wearable device, a tablet or a computer. Also in other examples, the third wireless device 406 could be: a server, a network, a computer, or a connected device.

Exchange of synchronization data over the NFMI channel 410 in some examples is controlled, perhaps requiring the first wireless device 402 to request transfer of data from the second wireless device 404 before the second wireless device 404 transfers its optimized set of data to the first wireless device 402.

The wireless devices 402, 404 can be additionally configured to internally generate additional data, such as individually measured vital signs and/or local microphone data. This additional data can then also be synchronized over the NFMI channel 410 before transmission to the third wireless device 406.

Figure 5:
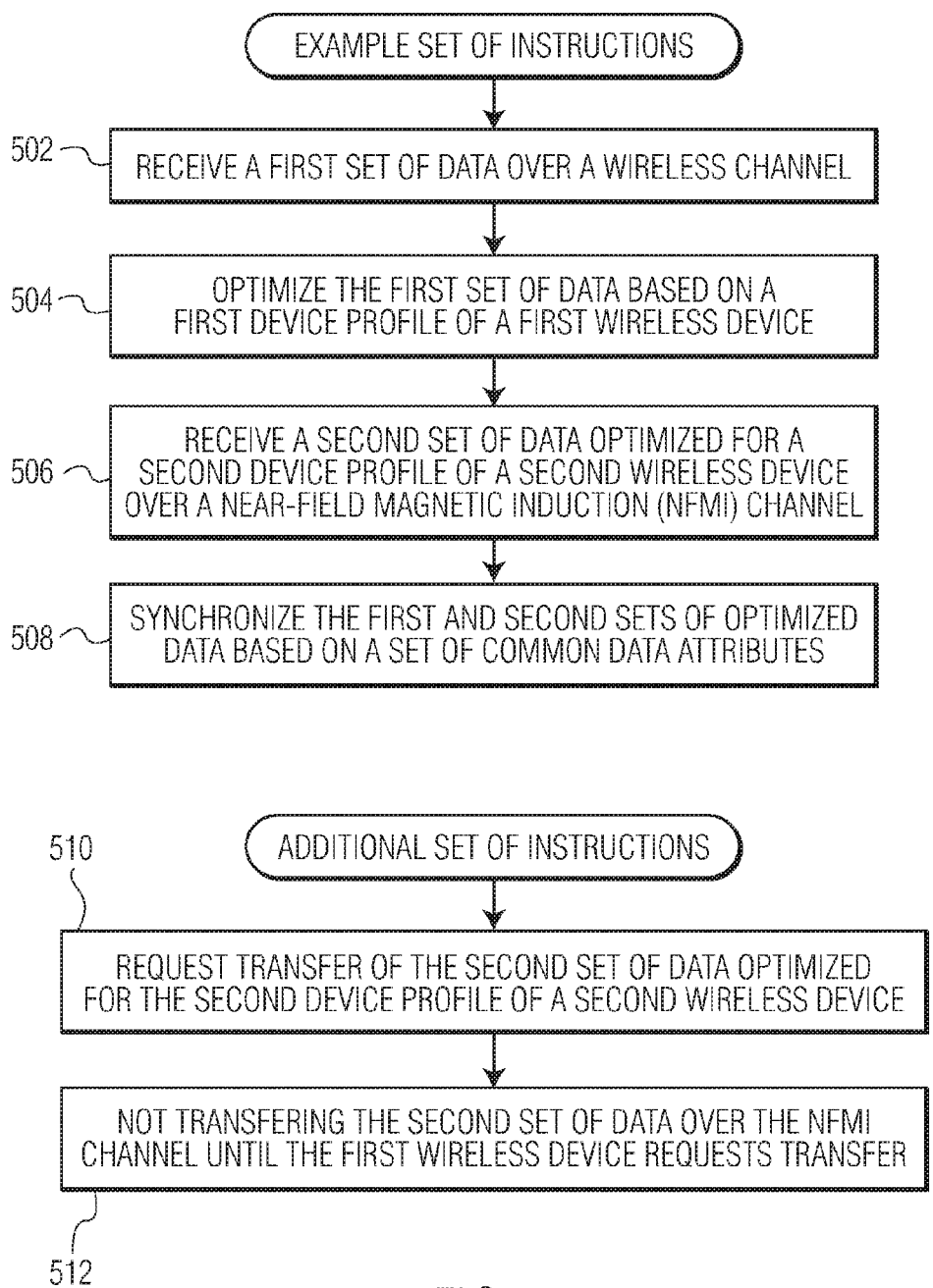
FIG. 5 is an example set of instructions for enabling NFMI based synchronization.

FIG. 5 is an example set of instructions 500 for enabling NFMI based synchronization. The order in which the instructions are discussed does not limit the order in which other example embodiments implement the instructions unless otherwise specifically stated. Additionally, in some embodiments the instructions are implemented concurrently.

A first example instruction set begins in 502, by receiving a first set of data over a wireless channel. Next in 504, optimize the first set of data based on a first device profile of a first wireless device. Then in 506, receive a second set of data optimized for a second device profile of a second wireless device over a near-field magnetic induction (NFMI) channel. In 508, synchronizing the first and second sets of optimized data based on a set of common data attributes.

The instructions can be augmented or replaced with one or more of the following additional instructions, presented in no particular order: 510—request transfer of the second set of data optimized for the second device profile of a second wireless device. 512—Not transferring the second set of data over the NFMI channel until the first wireless device requests transfer.

Note that the instructions and/or flowchart steps in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

Figure 6:
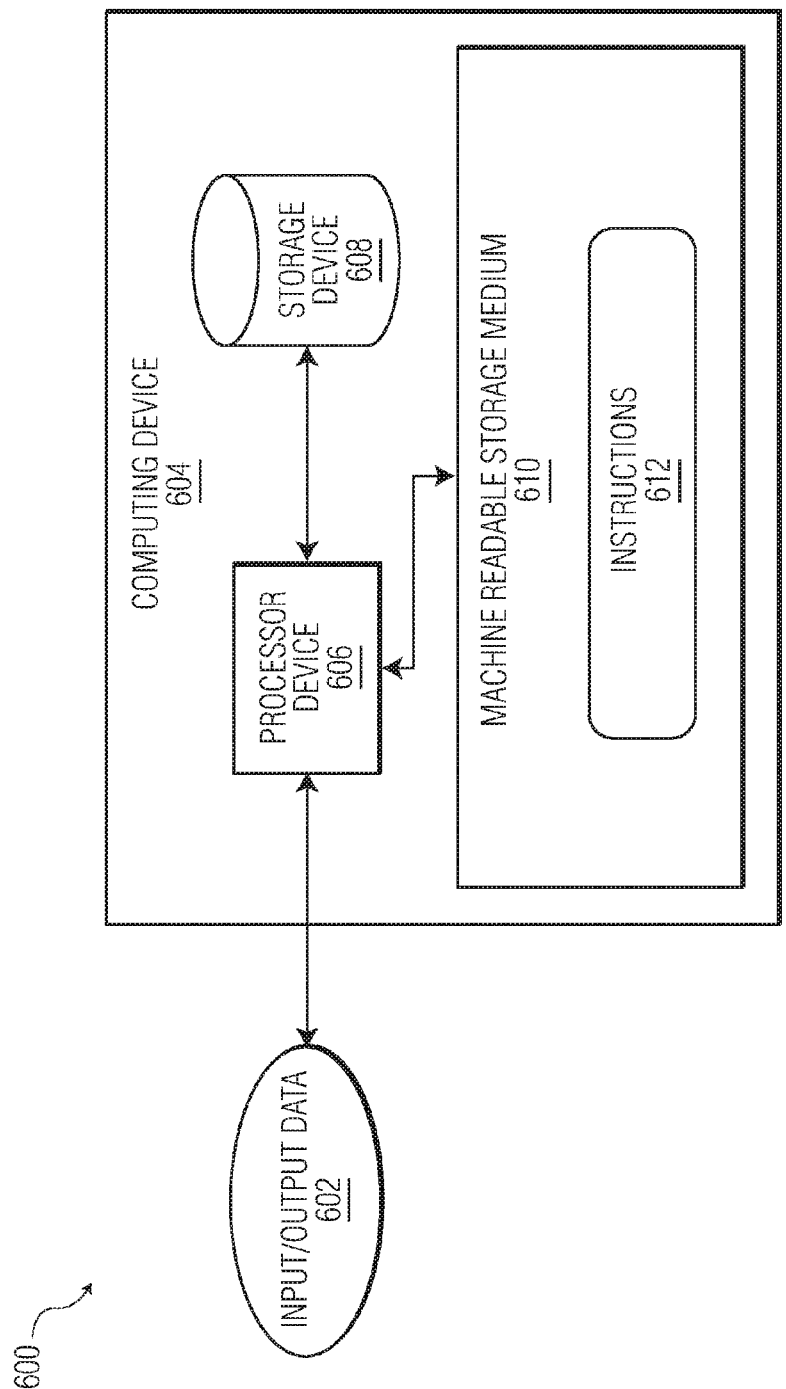
FIG. 6 is an example system for hosting the instructions within either the second or third apparatus for NFMI based synchronization.

FIG. 6 is an example system for hosting the instructions within either the second or third apparatus for NFMI based synchronization. The system 600 shows an input/output data 602 interface with an electronic apparatus 604. The electronic apparatus 604 includes a processor 606, a storage device 608, and a non-transient machine-readable storage medium 610. The machine-readable storage medium 610 includes instructions 612 which control how the processor 606 receives input data 602 and transforms the input data into output data 602, using data within the storage device 608. Example instructions 612 stored in the machine-readable storage medium 610 are discussed elsewhere in this specification. The machine-readable storage medium in an alternate example embodiment is a non-transient computer-readable storage medium.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and non-transient machine-readable storage medium using a bus and performs operations and tasks that implement one or more instructions stored in the machine-readable storage medium. The machine-readable storage medium in an alternate example embodiment is a computer-readable storage medium.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. An apparatus for synchronization, comprising:
   a first wireless device, having a first device profile, a near-field magnetic induction (NFMI) signal input and a wireless signal input;
   wherein the first wireless device is configured to,
   receive, through the wireless signal input, a first set of data;
   optimize the first set of data based on the first device profile;
   receive, through the NFMI signal input, a second set of data optimized for a second device profile of a second wireless device;
   synchronize the first and second sets of optimized data based on a set of common data attributes;
   internally generate a third set of data; and
   synchronize the third and second sets of data based on the set of common data attributes.

2. The apparatus of claim 1:
   wherein the common data attributes include at least one of: time, embedded code, signal feature, signal characteristic, or trigger condition.

3. The apparatus of claim 1:
   wherein the synchronization of the data sets includes at least one of: signal amplitude adjustment, signal power adjustment, equalization, signal balancing, signal compression, Dynamic Range Compression (DRC), or Ambient Volume Control (AVC).

4. The apparatus of claim 1:
   wherein the sets of data include at least one of: audio data, sensor data, transducer data, configuration data, health data, device status, battery charge level, or communications link quality.

5. The apparatus of claim 1:
   wherein the first and second device profiles include at least one of: an acoustic profile, sensor profile, transducer profile, or a battery profile.

6. The apparatus of claim 1:
   wherein the wireless devices include at least one of: a microphone, a earbud, a hearable, a smartphone, a smartwatch, a wearable device, a tablet or a computer.

7. The apparatus of claim 1:
   wherein the first and second sets of data are received from at least one of: a server, a network, a computer, a connected device, or a smartphone.

8. The apparatus of claim 1, wherein the first wireless device is further configured to:
   request transfer of the second set of data optimized for the second device profile of a second wireless device.

9. The apparatus of claim 8:
   further comprising the second wireless device, having an NFMI signal output;
   wherein the NFMI signal input is configured to receive the NFMI signal output over an NFMI channel; and
   wherein the second wireless device is further configured to not transfer the second set of data over the NFMI channel until the first wireless device requests transfer.

10. The apparatus of claim 1:
    further comprising the second wireless device;
    wherein the first and second wireless devices independently receive an audio data stream;
    wherein the first wireless device is configured to optimize the audio data stream based on the first device profile;
    wherein the second wireless device is configured to optimize the audio data stream based on the second device profile; and
    wherein the first wireless device is configured to align in time both optimized audio data streams.

11. An article of manufacture including at least one non-transitory, tangible machine readable storage medium containing executable machine instructions for synchronization of a first wireless device:
    wherein the article includes,
    the first wireless device, having a first device profile, a near-field magnetic induction (NFMI) signal input and a wireless signal input;
    wherein the instructions are stored in the first wireless device and include,
    receiving, through the wireless signal input, a first set of data;
    optimizing the first set of data based on the first device profile;
    receiving, through the NFMI signal input, a second set of data optimized for a second device profile of a second wireless device;
    synchronizing the first and second sets of optimized data based on a set of common data attributes;
    internally generating a third set of data; and
    synchronizing the third and second sets of data based on the set of common data attributes.

12. The article of claim 11:
    wherein the common data attributes include at least one of: time, embedded code, signal feature, signal characteristic, or trigger condition.

13. The article of claim 11:
    wherein synchronizing includes at least one of: signal amplitude adjustment, signal power adjustment, equalization, signal balancing, signal compression, Dynamic Range Compression (DRC), or Ambient Volume Control (AVC).

14. The article of claim 11:
wherein the sets of data include at least one of: audio data, sensor data, transducer data, configuration data, or health data.

15. The article of claim 11:
wherein the wireless devices include at least one of: a microphone, a earbud, a hearable, a smartphone, a smartwatch, a wearable device, a tablet or a computer.

16. The article of claim 11:
wherein the first and second device profiles include at least one of: an acoustic profile, sensor profile, or a transducer profile.

17. An method for synchronization, comprising:
receiving, at a first wireless device, a first set of data over a wireless channel;

optimizing, within the first wireless device, the first set of data based on a first device profile of a first wireless device;

receiving, at the first wireless device a second set of data optimized for a second device profile of a second wireless device over a near-field magnetic induction (NFMI) channel;

synchronizing, within the first wireless device, the first and second sets of optimized data based on a set of common data attributes;

internally generating, within the first wireless device, a third set of data; and synchronizing, within the first wireless device, the third and second sets of data based on the set of common data attributes.

* * * * *